United States Patent
Matsumoto et al.

(10) Patent No.: US 6,556,879 B1
(45) Date of Patent: Apr. 29, 2003

(54) NUMERICAL CONTROLLING UNIT USING MACHINING INFORMATION

(75) Inventors: Ichiro Matsumoto, Numazu (JP); Jun Fujita, Mishima (JP); Kouichi Katoh, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 09/504,384

(22) Filed: Feb. 15, 2000

(30) Foreign Application Priority Data

Feb. 15, 1999 (JP) .......................................... 11-035986

(51) Int. Cl.[7] ............................................. G05B 19/42
(52) U.S. Cl. ....................... 700/86; 700/87; 700/160; 700/175; 700/180
(58) Field of Search ........................ 700/86, 160, 71, 700/44, 188, 87, 180, 181, 175

(56) References Cited

U.S. PATENT DOCUMENTS

| 3,624,371 | A | * | 11/1971 | Neal et al. ................ 318/568.1 |
| 4,530,046 | A | * | 7/1985 | Munekata et al. ............ 700/86 |
| 5,132,912 | A | * | 7/1992 | Ito et al. ..................... 700/160 |
| 5,291,393 | A | * | 3/1994 | Matsumoto et al. .......... 700/86 |
| 5,544,046 | A | * | 8/1996 | Niwa .......................... 700/159 |
| 6,029,098 | A | * | 2/2000 | Serizawa et al. ........... 700/188 |
| 6,225,772 | B1 | * | 5/2001 | Aizawa et al. .............. 318/571 |
| 6,266,572 | B1 | * | 7/2001 | Yamazaki et al. ............ 700/96 |
| 6,400,998 | B1 | * | 6/2002 | Yamazaki et al. ............ 700/86 |
| 6,401,004 | B1 | * | 6/2002 | Yamazaki et al. .......... 700/159 |
| 6,411,862 | B1 | * | 6/2002 | Hazama et al. ............. 700/182 |
| 6,438,445 | B1 | * | 8/2002 | Yoshida et al. ............. 700/173 |

FOREIGN PATENT DOCUMENTS

| JP | 63250709 | * | 10/1988 | ......... G05B/19/403 |
| JP | 09-029584 A | | 2/1997 | ........... B23Q/15/00 |

* cited by examiner

Primary Examiner—Emanuel Todd Voeltz
Assistant Examiner—Crystal J. Barnes
(74) Attorney, Agent, or Firm—Pillsbury Winthrop LLP

(57) ABSTRACT

The numerical controlling unit includes an inputting part for inputting an inputting program. The inputting program includes a NC program defining a relative feed speed and a relative rotational number between a tool and a work, and also includes additional machining information. The inputting part is connected to an analyzing part, which is adapted to recognize the NC program and the additional machining information respectively from the inputting program inputted by the inputting part. The analyzing part is connected to a distributing part, which is adapted to make distributing information for the tool based on the NC program recognized by the analyzing part. The analyzing part and the distributing part are connected to a fusing part, which is adapted to fuse the distributing information and the additional machining information into controlling information for the tool. According to the numerical controlling unit, a more accurate numerical control can be achieved.

6 Claims, 3 Drawing Sheets

```
G0X0
G881
G01X100.0F1000          <=PATH OF UP-CUT
G883
G882
G01X0.0                 <=PATH OF DOWN-CUT
G883
    ⋮
    ⋮
```

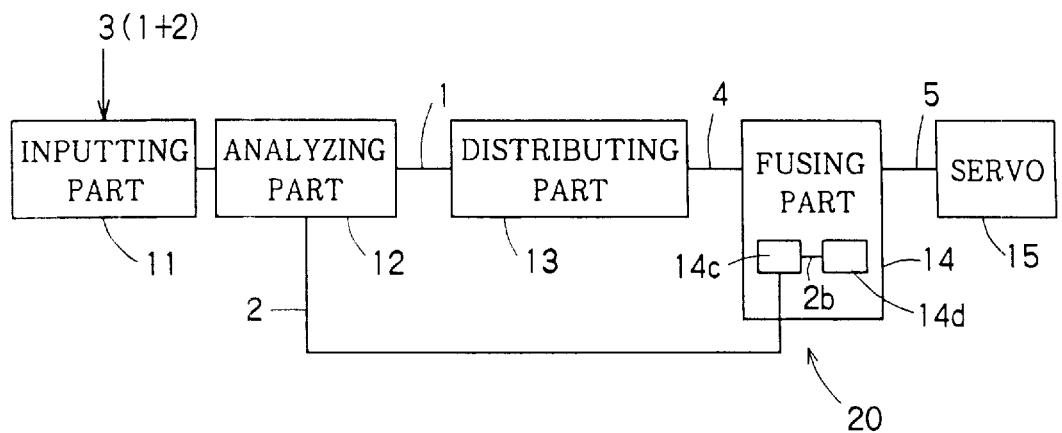
FIG. 3
```
G01X00F1000
G01X100.Y50.0    L80     <=TOOL-LOAD-RATIO 80%
G01X0.0 Y10.0    L120    <=TOOL-LOAD-RATIO 120%
G01X145.0 Y15.0  L100    <=TOOL-LOAD-RATIO 100%
    :
    :
```
FIG. 4
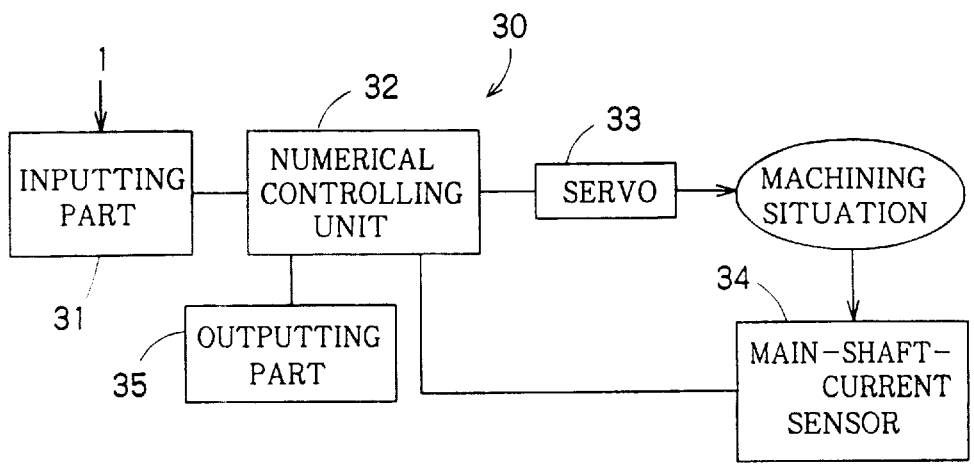
FIG. 5

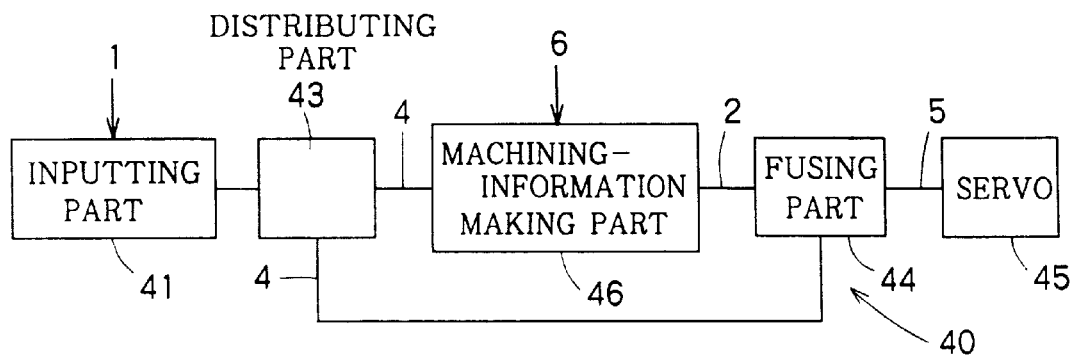
F I G. 6
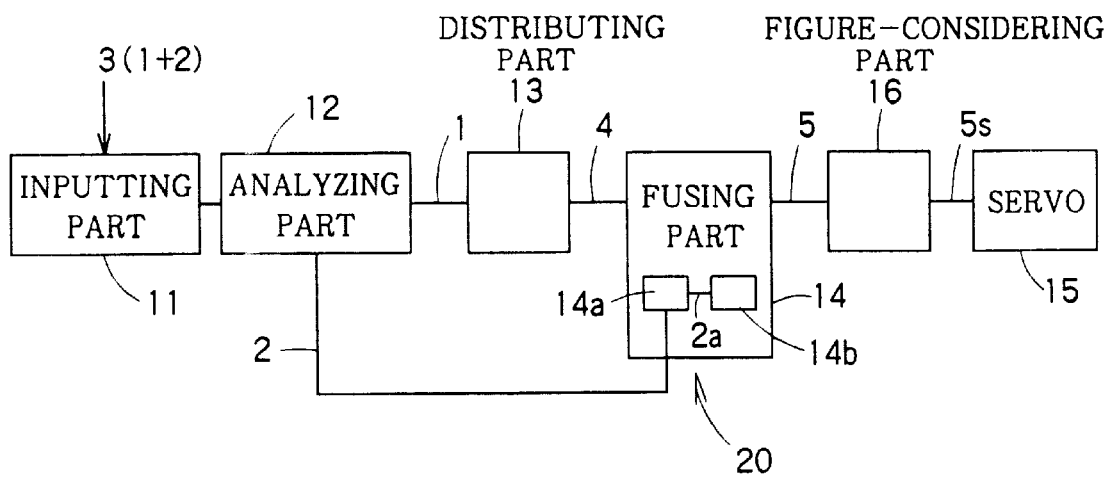
F I G. 7

NUMERICAL CONTROLLING UNIT USING MACHINING INFORMATION

BACKGROUND OF THE INVENTION

1. Field of the Invention

This invention relates to a numerical controlling unit for carrying out a numerical control based on a NC program, in particular, to a numerical controlling unit for carrying out a more effective numerical control by using additional machining information in addition to a feed speed and a rotational number defined by a NC program.

2. Description of the related art

As shown in FIG. 8, a conventional numerical controlling unit includes an inputting part 51 for inputting a NC program, and an controlling part 52 for carrying out a numerical control of a servo 53 based on the NC program inputted by the inputting part 51. Thus, the conventional numerical controlling unit may carry out the numerical control based on the NC program.

In general, the NC program may be made by a CAM, and define a relative feed speed and a relative rotational number between a tool and a work as objects of control.

As described above, the NC program in the conventional controlling unit defines only the relative feed speed and the relative rotational number between the tool and the work. However, additional information, which may be obtained from an actual cutting situation or the like, may be very useful for carrying out a numerical control. Furthermore, a tool-load-ratio, which is very useful for machining, may be calculated by a simulation with a computer whose performance has been highly developed recently.

In addition, the NC program defining the relative feed speed and the relative rotational number between the tool and the work is made for a specific machining tool. That is, basically, the NC program can not be used for another machining tool. Thus, in the conventional numerical controlling unit, respective NC programs have to be made for respective machining tools.

SUMMARY OF THE INVENTION

Therefore, the object of this invention is to provide a controlling unit that can carry out a more effective numerical control by using additional machining information in addition to a feed speed and a rotational number defined by a NC program. The object of this invention is also to provide a controlling unit that can be commonly used for several machining tools via an easy modification if any.

To achieve the above object, this invention is characterized by following features. That is, this invention is a controlling unit including: an inputting part for inputting an inputting program which includes a NC program and additional machining information, said NC program defining a relative feed speed and a relative rotational number between a tool and a work; an analyzing part for recognizing the NC program and the additional machining information respectively from the inputting program inputted by the inputting part; a distributing part for making distributing information for the tool based on the NC program recognized by the analyzing part; and a fusing part for fusing the distributing information for the tool made by the distributing part and the additional machining information recognized by the analyzing part into controlling information for the tool.

According to the feature, the controlling information for the tool is made by fusing the distributing information for the tool and the additional machining information included in the inputting program. Thus, a more accurate numerical control can be achieved.

Alternatively, this invention is characterized by following features. That is, this invention is a controlling unit including: an inputting part for inputting a NC program defining a relative feed speed and a relative rotational number between a tool and a work; a distributing part for making distributing information for the tool based on the NC program inputted by the inputting part; a machining-information making part for making additional machining information based on the distributing information for the tool made by the distributing part; and a fusing part for fusing the distributing information for the tool made by the distributing part and the additional machining information made by the machining-information making part into controlling information for the tool.

According to the feature, the controlling information for the tool is made by fusing the distributing information for the tool and the additional machining information made based on the distributing information for the tool by the machining-information making part. Thus, a more accurate numerical control can be achieved.

Preferably, the additional machining information is information whether a machining way may be an up-cut way or a down-cut way. Alternatively, the additional machining information may be information concerned about a tool-load-ratio of the tool.

BRIEF DESCRIPTION OF THE DRAWINGS

FIG. 3 is a schematically block diagram of a second embodiment of a numerical controlling unit according to the invention;

FIG. 4 is showing a list of an inputting program inputted into the inputting part shown in FIG. 3;

FIG. 5 is showing a system for making a program;

FIG. 6 is a schematically block diagram of a third embodiment of a numerical controlling unit according to the invention;

FIG. 7 is a schematically block diagram of a fourth embodiment of a numerical controlling unit according to the invention;

BEST MODE FOR CARRYING OUT THE INVENTION

Embodiments of the invention are explained as below in more detail.

Figures 1, 2:
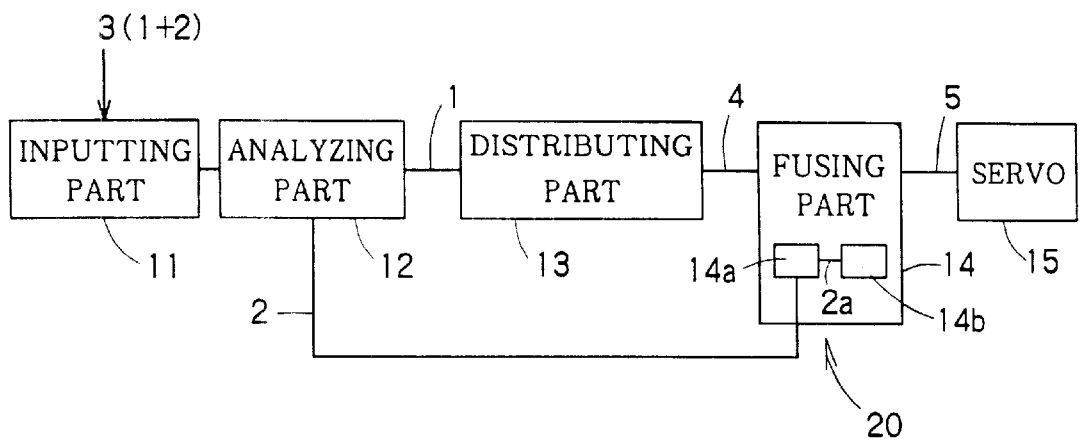
FIG. 1 is a schematically block diagram of a first embodiment of a numerical controlling unit according to the invention.
FIG. 2 is showing a list of an inputting program inputted into the inputting part shown in FIG. 1.
Figure 8:
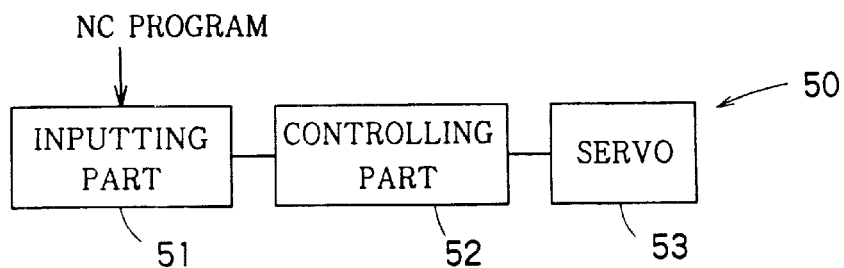
FIG. 8 is a schematically block diagram of a conventional numerical controlling unit.

FIG. 1 is a schematically block diagram of a first embodiment of a numerical controlling unit according to the invention. As shown in FIG. 1, the numerical controlling unit 20 of the first embodiment includes an inputting part 11 for inputting an inputting program 3. The inputting program 3 includes a NC program 1 defining a relative feed speed and a relative rotational number between a tool and a work, and also includes additional machining information 2.

The inputting part 11 is connected to an analyzing part 12, which is adapted to recognize the NC program 1 and the additional machining information 2 respectively from the inputting program 3 inputted by the inputting part 11. The analyzing part 12 is connected to a distributing part 13, which is adapted to make distributing information 4 for the tool based on the NC program 1 recognized by the analyzing part 12.

The analyzing part 12 and the distributing part 13 are connected to a fusing part 14, which is adapted to fuse the distributing information 4 for the tool made by the distributing part 13 and the additional machining information 2 recognized by the analyzing part 12 into controlling information 5 for the tool. The fusing part 14 is connected to a servo 15, which is an object of control.

In the first embodiment, the additional machining information 2 is information whether a machining way is an up-cut way or a down-cut way. The additional machining information 2 can be obtained as information for each machining block by various simulations using the NC program 1. Alternatively, the additional machining information 2 can be obtained by processing data included therein when the NC program 1 is made by a CAM or the like.

FIG. 2 shows an example of an inputting program 3. As shown in FIG. 2, a command for up-cut way is represented by G881, a command for down-cut way is represented by G882, and a command for canceling data is represented by G883. They are modal data, respectively.

The distribution information 4 is, for example, an instructed speed for the tool and an instructed rotational number for the tool, with respect to a sampling unit of time.

The distribution information 4 is, for example, an instructed speed for the tool and an instructed rotational number for the tool, with respect to a sampling unit of time.

The controlling information 5 is, for example, parameters for controlling the servo 15 with respect to a sampling unit of time.

The fusing part 14 of the first embodiment includes an offset-value calculating part 14a for calculating a suitable offset-value based on the additional machining information 2, and a main part 14b for fusing the offset-value 2a calculated by the offset-value calculating part 14a and the distributing information 4 into the controlling information 5.

An operation of the first embodiment described above is explained as below.

The inputting program 3, which includes the NC program 1 defining the relative feed speed and the relative rotational number between the tool and the work and the additional machining information 2, is inputted into the inputting part 11.

The inputting program 3 inputted by the inputting part 11 is read by the analyzing part 12. Then, the additional machining information 2 and the NC program 1 in the inputting program 3 are respectively recognized by the analyzing part 12.

The distributing part 13 makes distributing information 4 for the tool, based on the NC program 1 recognized by the analyzing part 12.

On the other hand, the offset-value calculating part 14a of the fusing part 14 calculates a suitable offset-value 2a, based on the additional machining information 2 recognized by the analyzing part 12. The suitable offset-value 2a can be calculated more accurately owing to the additional machining information 2.

Then, the main part 14b of the fusing part 14 fuses the offset-value 2a calculated by the offset-value calculating part 14a and the distributing information 4 into controlling information 5. The controlling information 5 can be obtained more accurately because the distributing information 4 is amended by using the offset-value 2a that is calculated highly accurately. The controlling information 5 is sent to the servo 15 that is the object of control.

As described above, according to the first embodiment, the offset-value 2a is calculated highly accurately owing to the additional machining information 2. Thus, the machining with the suitable offset-value can be achieved more easily. In addition, as the distributing information 4 is amended by the offset-value, the controlling information 5 can be obtained more accurately. That is, the controlling information 5 may have few machining errors.

Even when the same course is machined, cutting resistance is different depending on the machining way such as an up-cut way or a down-cut way. Thus, it is very effective to use the information whether the machining way is an up-cut way or a down-cut way as the additional machining information in order to determine the offset-value.

The offset-value for the up-cut way or the offset-value for the down-cut way may be obtained from calculations with some simulations or some CAMs. The offset-values may be also obtained from actual machining tests. The offset-values themselves may be used as additional machining information 2.

FIG. 3 is a schematically block diagram of a second embodiment of a numerical controlling unit according to the invention. As shown in FIG. 3, in the numerical controlling unit 20 of the second embodiment, the additional machining information 2 is information concerned about a tool-load-ratio of the tool. The tool-load-ratio can be obtained as information for each machining block by various simulations using the NC program 1. Alternatively, the tool-load-ratio can be obtained by processing data included therein when the NC program 1 is made by a CAM or the like.

FIG. 4 shows an example of an inputting program 3. In FIG. 4, F represents a speed (a distributing speed) instructed by the NC program 1, L represents a load-ratio when the machining is carried out at the speed, and LM represents a target tool-load-ratio. Then, a speed FL considering the tool-load-ratio may be obtained from FL=F×LM/L. That is, in the case that the NC program including the suitable instructed speed F is made by the CAM without considering which machine tool carries out the machining, the speed FL can be obtained by using the target tool-load-ratio LM, if the tool-load-ratio L for the instructed speed F is used as the additional machining information.

The fusing part 14 of the second embodiment includes a tool-load-ratio calculating part 14c for calculating a corresponding tool-load-ratio 2b (L) based on the additional machining information 2, and a main part 14d for fusing the tool-load-ratio 2b calculated by the tool-load-ratio calculating part 14c and the distributing information 4 (including the instructed speed F) into the controlling information 5 (including the speed FL) that can keep the tool-load-ratio (LM) at a desired value. For example, the main part 14d is adapted to make the controlling information 5 in such a manner that the controlling information 5 defines a rate with respect to 100% for the instructed removing value.

The other components or structures of the second embodiment are substantially the same as the first embodiment shown in FIG. 1. Thus, the other components or structures of the second embodiment are indicated by the same reference numerals as the first embodiment, and the detail explanation thereof is omitted.

In the second embodiment, the main part 14d of the fusing part 14 fuses the tool-load-ratio 2b (L) calculated by the tool-load-ratio calculating part 14c and the distributing information 4 (including the instructed speed F) into the controlling information 5 (including the speed FL) that can keep the tool-load-ratio (LM) at a desired value.

According to the second embodiment, by using the tool-load-ratio as the machining information, the machining can be carried out at a most suitable speed. In addition, undesired wear and damage of the tool can be effectively prevented.

Furthermore, the numerical controlling unit 20 can suitably carry out the machining by using a machine tool that can machine a work only with a lower tool-load-ratio, without changing a NC program made for a higher tool-load-ratio. For example, it is assumed that the NC program defines a tool-load-ratio 60% when an instructed speed F is 2000, while the machine tool can machine the work only with a tool-load-ratio not more than 30%. In the conventional numerical controlling unit, the instructed speed of the NC program has to be amended in such a manner the tool-load-ratio becomes not more than 30%. However, in the second embodiment, by calculating FL=F×LM/L, i.e., FL=2000×30/60=1000, the suitable speed (FL=1000) that can keep the tool-load-ratio not more than 30% can be automatically obtained without amending the NC program.

In the second embodiment, the tool-load-ratio can be obtained not only by the simulations or the like but also by actual machining tests. For example, a numerical controlling unit can find a tool-load-ratio by using current-feedback of a main shaft. FIG. 5 shows a system having such a numerical controlling unit for making an inputting program 3 wherein a tool-load-ratio is additional machining information 2.

As shown in FIG. 5, the system 30 for making the program includes: an inputting part 31 for inputting a NC program 1, a servo 33 that is an object of control, a numerical controlling unit 32 for controlling the servo 33 according to the NC program 1 inputted by the inputting part 31, and a main-shaft-current sensor 34 for detecting a main-shaft-current while the servo 33 operates for machining a work.

The main-shaft-current sensor 34 is connected to the numerical controlling unit 32. The numerical controlling unit 32 is adapted to calculate a tool-load-ratio based on the main-shaft-current detected by the main-shaft-current sensor 34. Then, the numerical controlling unit 32 is also adapted to append information of the tool-load-ratio to the NC program 1. In addition, the numerical controlling unit 32 is connected to an outputting part 35. Thus, the NC program 1 added the information of the tool-load-ratio is adapted to be outputted from the outputting part 35.

According to the system 30, the information concerned about the tool-load-ratio can be obtained from actual machining situations. Thus, the inputting program 3 including the tool-load-ratio as the additional machining information 2 can be made more easily.

As described above, the methods for obtaining the program added the additional machining information are as follows.

(1) Appending machining information inside of the CAM to the NC program.
(2) Obtaining machining information from simulations, and appending it to the NC program.
(3) Obtaining machining information from actual machining situations, and appending it to the NC program.

In addition, the machining information can be obtained inside the numerical controlling unit. FIG. 6 shows a third embodiment of a numerical controlling unit according to the invention, wherein the machining information can be obtained inside the numerical controlling unit. As shown in FIG. 6, the numerical controlling unit 40 of the third embodiment includes an inputting part 41 for inputting a NC program 1 defining a relative feed speed and a relative rotational number between a tool and a work.

The inputting part 41 is connected to a distributing part 43, which is adapted to make distributing information 4 for the tool based on the NC program 1 inputted by the inputting part 41.

The distributing part 43 is connected to a machining-information making part 46, which is adapted to make additional machining information 2 based on the distributing information 4 for the tool made by the distributing part 43. The distributing part 43 is also connected to a fusing part 44, which is adapted to fuse the distributing information 4 for the tool made by the distributing part 43 and the additional machining information 2 made by the machining-information making part 46 into controlling information 5 for the tool. The fusing part 44 is connected to a servo 45, which is an object of control.

In the third embodiment, work data 6 can be inputted into the machining-information making part 46. Then, the machining-information making part 46 can make additional machining information 2, by carrying out simulations based on the work data 6 and the distributing information 4 made by the distributing part 43. The work data 6 may be CAD data. More preferably, the work data 6 may be actual data measured by a laser measuring instrument or the like. In the latter case, the additional machining information may be obtained more accurately.

An operation of the third embodiment described above is explained as below.

The NC program 1 defining the relative feed speed and the relative rotational number between the tool and the work is inputted into the inputting part 41.

The distributing part 43 makes distributing information 4 for the tool, based on the NC program 1 inputted by the inputting part 41.

The machining-information making part 46 makes the additional machining information 2 through the simulations using the work data 6, based on the distributing information 4 made by the distributing part 43.

The fusing part 44 fuses the additional machining information 2 made by the machining-information making part 46 and the distributing information 4 into controlling information 5. The controlling information 5 is sent to the servo 45 that is the object of control.

According to the third embodiment, the machining-information making part 46 can make the additional machining information 2, and the additional machining information 2 can be used for the machining control. Thus, the machining control can be achieved more accurately.

A fourth embodiment of a numerical controlling unit according to the invention is explained with reference to FIG. 7 that is a schematically block diagram of the fourth embodiment.

As shown in FIG. 7, the numerical controlling unit 20 of the fourth embodiment includes a figure-considering part 16 arranged between the fusing part 14 and the servo 15. The figure-considering part 16 is adapted to make figure-considering information 5s by processing the controlling information based on figure information. The figure-considering information 5s is adapted to be sent to the servo 15.

The other components or structures of the fourth embodiment are substantially the same as the first embodiment shown in FIG. 1. Thus, the other components or structures of the fourth embodiment are indicated by the same reference numerals as the first embodiment, and the detail explanation thereof is omitted.

According to the fourth embodiment, after the position and the speed of the tool are controlled by using the additional machining information, the acceleration and the deceleration of the tool may be controlled suitably for the figure of the work by the figure-considering part 16. Thus, the work may be machined at a higher grade.

As described above, the numerical controlling unit of the invention can carry out a more effective numerical control by using the additional machining information in addition to the feed speed and the rotational number defined by the NC program. Furthermore, the numerical controlling unit can be commonly used for several machining tools via an easy modification if any.

What is claimed is:

1. A numerical controlling unit constructed and arranged to use machining information comprising;

an inputting part for inputting an inputting program which includes a NC program and additional machining information, said NC program defining a relative feed speed and a relative rotational number between a tool and a workpiece, an analyzing part for recognizing the NC program and the additional machining information respectively from the inputting program inputted by the inputting part, a distributing part for making distributing information for the tool based on the NC program recognized by the analyzing part, and a fusing part for fusing the distributing information for the tool made by the distributing part and the additional machining information recognized by the analyzing part into controlling information for the tool.

2. A numerical controlling unit constructed and arranged to use machining information comprising;

an inputting part for inputting a NC program defining a relative feed speed and a relative rotational number between a tool and a workpiece, a distributing part for making distributing information for the tool based on the NC program inputted by the inputting part, and a machining-information making part for making additional machining information based on the distributing information for the tool made by the distributing part, and a fusing part for fusing the distributing information for the tool made by the distributing part and the additional machining information made by the machining information making part into controlling information for the tool.

3. A numerical controlling unit according to the claim 1, wherein:

the additional machining information is information whether a desired machining is an up-cut way or a down-cut way.

4. A numerical controlling unit according to the claim 1, wherein:

the additional machining information relates to a tool-load-ratio of the tool.

5. A numerical controlling unit according to the claim 2, wherein:

the additional machining information whether a desired machining is an up-cut way or a down-cut way.

6. A numerical controlling unit according to the claim 2, wherein:

the additional machining information is information relates to a tool-load-ratio of the tool.

* * * * *